July 26, 1966 A. BOTTANI 3,262,750
DEVICE FOR MOTION PICTURE PROJECTION BY MEANS
OF A ROTATING PRISM PROVIDED WITH SHUTTER
Filed June 9, 1964
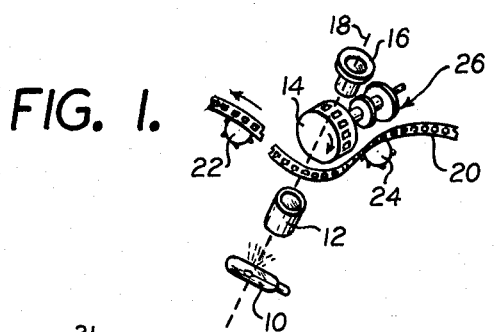
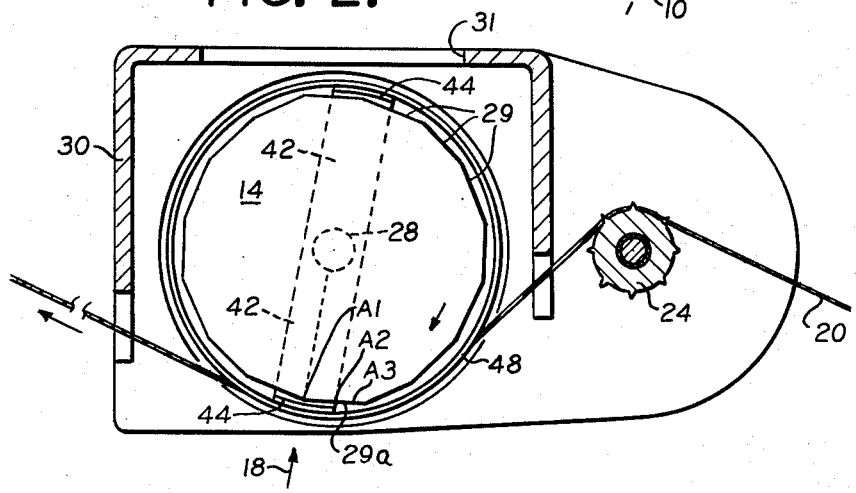
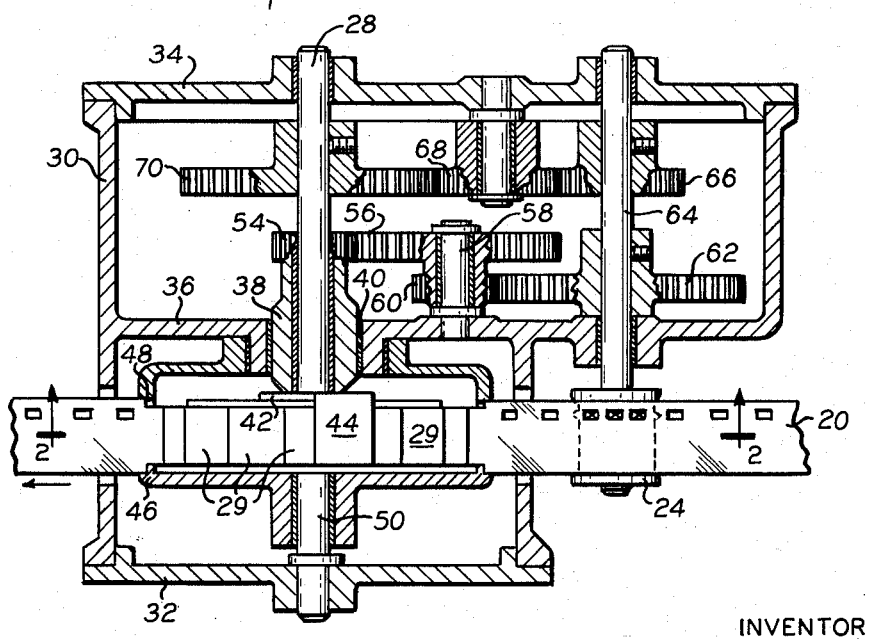
INVENTOR
ANGELO BOTTANI
BY
ATTORNEYS.

United States Patent Office 3,262,750
Patented July 26, 1966

3,262,750
DEVICE FOR MOTION PICTURE PROJECTION BY MEANS OF A ROTATING PRISM PROVIDED WITH SHUTTER
Angelo Bottani, Milan, Italy, assignor to Societa Internazionale Fonovisione S.p.A., Milan, Italy, a corporation of Italy
Filed June 9, 1964, Ser. No. 373,615
Claims priority, application Italy, June 11, 1963, 12,242/63
8 Claims. (Cl. 352—119)

This invention relates to a motion picture projector and particularly to a motion picture projector with multi-face rotating prism in which the prism is rotated through a transmission by a sprocket driven by the film while the latter moves in front of the faces of the prism resting against suitable lateral guide shoes. Such projectors are commonly known as "moviolas."

It is known that with devices of this type, it is possible to obtain an optical switching of a plurality of photographs moving with uniform motion between a source of light and the prism. The passage of the photographs takes place in synchronism with the rotation of the prism in such a manner so that each photograph passing through the projection light beam is, for a certain period of time, facing and parallel—neglecting the curvature of the film —to one faces of the rotating prism. At the moment when the optical axis passes through the middle of the photograph and of the corresponding face of the prism, a stationary image is projected on a screen and it is obvious that the image would be optically correct if the photograph could be projected continuously in the said condition of the optical axis passing through its center. Actually, when the photograph enters and leaves the optical axis, this condition is not satisfied and the projected image at these times appears slightly decreased in size. As a result the image formed on the screen is generally of poor quality.

In addition to this specific effect of prior rotating-prism projection systems, these devices have the additional drawback that the light flux incident on the film cannot exceed a given value for each condition of room illumination on the screen. When this value of illumination is exceeded, the projection is no longer comfortable due to the fact that the sequential passage or the flickering of the images is noted, this phenomenon being commonly known as "flicker."

One object of the present invention is to provide a rotating prism projector which eliminates the degradation of the quality of the images due to the switching of the prism.

Another object of this invention is to provide a device which permits brighter projection without the occurrence of flicker.

In accordance with the present invention, the above and other objects are achieved by using a movable light shutter arranged between the source of light and the screen, and preferably between the source and the rotating prism, capable of interrupting the projecting beam three times for each photograph being projected. The first interruption takes place when the optical axis passing through the center of the prism is aligned with the apex of the angle formed by a reference facet of the prism with the facet immediately preceding the reference facet, while the second and third interruptions take place when the reference facet of the prism, by virtue of its rotation, is beyond the optical axis respectively one-third or two-thirds of the width of the facet.

In this way, the frequency of light interruption is increased by a factor of three, e.g., from 24 times per second (standard of 24 frames per second) to 72 times per second; to an interruption frequency at which the visual sensation of the images, from the physiological standpoint of the eye, corresponds to that of a fixed source of light.

In accordance with a preferred embodiment of the invention, the shutter consists of a bushing which rotates freely around the rotating shaft of the prism, provided with a masking part for the interruption of the light beam, arranged between the faces of the prism and the film guide shoes. The bushing is driven by the sprocket which is driven by the film via a suitable transmission.

Other details and features of the invention will be illustrated solely by way of example with reference to a preferred embodiment shown in the accompanying illustrative drawing in which:

FIG. 1 is a schematic view in perspective illustrating the present invention;

FIG. 2 is a sectional view taken along the line 2—2 of FIG. 3; and

FIG. 3 is a horizontal sectional view through the axis of rotation of the prism and shutter of the present invention.

Referring now to the drawing in detail and especially to FIG. 1 thereof, a source of light 10 is directed at a condenser lens 12, a rotating prism 14 and an objective lens 16, all arranged along the optical axis of projection 18, passing through the center of the prism 14. A strip of film 20 passes between the lens 12 and the prism 14. Film 20 is advanced by a movement of drive sprockets 22. The film in its turn drives a sprocket 24 forming part of the device, which sprocket drives the prism 14 in such a way as to cause it to rotate in the same direction and in synchronism with the movement of the film. The direction of rotation and of the movement of the prism 14 and of the film 20 are indicated by arrows. In accordance with the invention, between the prism 14 and the film 20, a shutter 26 rotates around a shaft 28 of the prism at such a speed as to interrupt the beam of light coming from the lamp 10 three times for each frame of the film 20 being projected. The sprocket 24, in addition to driving the prism, also controls the shutter via a transmission which will be described below.

In FIGS. 2 and 3, there is shown in greater detail the shutter 26, the prism 14 and the drive transmission for these members which, taken together, constitute my projection device. This device is contained in a housing formed of a body 30 and of two closure covers 32 and 34 fastened to the body by any well known means such as screws (not shown). Body 30 has an opening 31 along the optical axis 31 so that it will not interfere with projection.

Perpendicular to the covers 32 and 34, there is arranged the rotatable shaft 28 which rotatably supports the prism 14 provided with a plurality of faces or facets 29 which, solely by way of example, are shown as 16 in number in the drawing. The shaft 28 is rotatably supported on one side by the cover 34 and on the other side by an inner wall 36 of the body 30 through a bushing 38 which rotates freely around the shaft 28 within an aperture 40 in said supporting wall 36. The bushing 38 constitutes part of the shutter 26 and for this purpose has two radial arms 42 extending in opposite directions and each terminating in an angular blade or surface 44 shown in plan view in FIG. 3, which, during the rotation, passes between the facets 29 of the prism and two film guide shoes 46 and 48. These surfaces or blades 44 constitute the light interfering means of the shutter 26 for interrupting the beam of light coming from the source and directed onto the prism. There are preferably two of them arranged 180° apart in order to obtain a symmetrical shutter action for the frame. Each masking surface 44 has a width equal to that of the facets of the prism and a length not less than the thickness of the latter. It is preferable, furthermore, that each have a slight curvature on the inside so as to rotate parallel to the guide shoes 46 and 48 and thus better utilize the area included between the latter and the prism with respect to the convergence of the beam of light. The shoes 46 and 48 are coaxial to the shaft 28 and are freely mounted, the first on a shaft 50 fastened to the cover 32, and the second on an annular extension 52 of the wall 36 within which the aperture 40 is provided. Both shoes are provided with supporting and bearing seats for guiding the film 20.

The bushing 38 of the shutter 26 has fixed to it a gear 54 which is driven by an intermediate gear 56, mounted on a shaft 58 carried by the inner wall 36. Also fixed to shaft 58 is a gear 60 which is driven by a gear 62 fastened to a rotating shaft 64 which also carries the sprocket 24. The shaft 64 is rotatably supported by the cover 34 and the wall 36. There is, furthermore, fastened on shaft 64, a gear 66 which drives the shaft 28, and hence prism 14, through an intermediate gear 68 and the gear 70 keyed onto shaft 28. The arrangement and dimensioning of the various gears is such as to cause the prism to rotate in the same direction as and in synchronism with the advance of the film 20 and the rotation of shutter arms 42 which, in the embodiment shown, also rotate in the same direction as the prism and at a speed which assures, for each frame passing below the optical axis, three successive interruptions of the beam of light. These interruptions take place at the moment when the start of the face of the rotating prism is at the optical axis 18 and subsequently, when one-third and two-thirds of its width are below the optical axis.

In FIGS. 2 and 3, the device is shown in the condition in which the optical axis 18 (see FIG. 2) intersects the starting point $A_1$ of the reference face 29a of the prism, namely at the moment when it is aligned with the angle formed by the projecting face and the face which has already passed below the optical axis. At this moment the blade 44 of the shutter is below the optical axis between the face 29a of the prism 14 and the frame, thus effecting the first interruption of the light beam. The said blade 19 will again be between the said face of the prism and the said frame a second time and subsequently, a third time, when the optical axis 18, still passing through the center of the prism, comes in alignment with the points $A_2$ and $A_3$ of the said face 14a which are spaced from the point $A_1$ by one-third and two-thirds, respectively, of the width of the said facet. Each frame being projected will, therefore, be interrupted three times so that for a standard film of 24 frames passing below the optical axis, there will be frequency of interruption which is three times greater, or, namely, 72. Under these conditions, the picture on the screen will appear as though the source of illumination were fixed, thus obtaining comfortable viewing.

In the illustrated and preferred embodiment, reference has been made to a shutter constituting a single unit with the projection device. It is obvious, however, that the interruption of the beam of light could be effected in any other way, for instance, by alternately inserting at the times of interruption of the light, a screen between the source of light and the film.

Furthermore, it will be obvious that the motor power for rotating the prism and shutter need not come from sprocket 24. For example such a drive sprocket could be located elsewhere as coaxially with the shutter and prism itself.

While I have herein shown and described the preferred form of my invention and have suggested modifications thereof, other changes and modifications may be made therein within the scope of the appended claims without departing from the spirit and scope of this invention.

What I claim is:

1. A motion picture projection apparatus for projecting along an optical axis and onto a screen film moving in a given direction, comprising a light source, a multi faceted prism mounted for rotation in timed relation with and in the same direction as said film, the axis of rotation of said prism being intersected by said optical axis, means for supporting the film in close confronting relation with said prism, a light-shutter disposed between said light source and said screen for interrupting the projection of light at least three equi-spaced times during the time it takes a frame of said film to pass by the optical axis of said apparatus.

2. The motion picture projection apparatus of claim 1, wherein means are included to synchronize the operation of said shutter with the movement of said prism so that for each frame of film one interruption occurs when the apex of the angle formed by two adjacent facets of said prism is disposed on said optical axis.

3. A motion picture projection apparatus for projecting along an optical axis and onto a screen film moving in a given direction, comprising a light source, a multi faceted prism mounted for rotation in timed relation with and in the same direction as said film, the axis of rotation of said prism being intersected by said optical axis, means for supporting the film in close confronting relation with said prism, a light-shutter disposed between said light source and said screen for interrupting the projection of light three times during the time it takes a frame of said film to pass by the optical axis of said apparatus, means for synchronizing said shutter with said prism so that one interruption during each frame occurs when the apex of the angle formed by a reference facet and the facet immediately in advance thereof is disposed on said optical axis, and the second and third interruptions occur when one-third and two-thirds, respectively, of said reference facet have passed through said optical axis.

4. The motion picture projection apparatus of claim 3, wherein said shutter is disposed between said light source and said prism.

5. Motion picture projection apparatus for projecting film onto a screen, comprising a lamp for illuminating along an optical axis, means for advancing film in a predetermined direction and path and through said optical axis, a rotatable multifaceted prism, a shaft mounting said prism for rotation about an axis which intersects said optical axis, a shutter comprising a light-masking part disposed between said prism and film path, an arm for supporting said light masking part, a bushing rotatably disposed about said shaft and supporting said arm, means for rotating said prism in timed relation with the advance of the film, and means for rotating said shutter in timed relation with the advance of said film so that said light masking part masks the projection three times while each frame of film is passing through said optical axis.

6. The projection apparatus of claim 5, wherein said means for rotating said shutter is so arranged that the initial masking of projection of each frame occurs as the apex of the angle defined by two facets is on said optical axis and the second and third interruptions occur when one-third and two-thirds of the trailing of said two facets has passed through said optical axis.

7. Motion picture projection apparatus for projecting film onto a screen, comprising a lamp for illuminating along an optical axis, means for advancing film in a predetermined direction and path and through said optical axis, a rotatable multifaceted prism, a shaft mounting said prism for rotation about an axis which intersects said optical axis, a shutter comprising a bushing rotatably disposed about said shaft, a pair of arms secured to said bushing and extending away therefrom in diametrically opposed directions, a light masking part secured to each of said arms and adapted to pass between said prism and the predetermined path of said film, means for rotating said prism in timed relation with the advance of the film, and means for rotating said shutter in timed relation with the advance of said film so that said light masking parts mask the projection each time the apex of an angle defined by two facets of said prism passes through said optical axis, and each time one-third and two-thirds of the trailing of the two facets has passed through said optical axis.

8. The apparatus of claim 7, further comprising a sprocket having a portion disposed along the projected path of said film for engagement and rotation thereby, means for connecting said sprocket to said prism for rotating said prism in timed relation with said sprocket, and means for connecting said sprocket to said bushing for rotating said shutter in timed relation with said sprocket, whereby to rotate said shutter and prism in timed relation with each other.

References Cited by the Examiner
UNITED STATES PATENTS

| | | | |
|---|---|---|---|
| 2,476,503 | 7/1949 | Maytum | 352—119 |
| 2,906,167 | 9/1959 | Casledello et al. | 352—119 X |

JULIA E. COINER, *Primary Examiner.*